US010996362B2

(12) United States Patent
Lu et al.

(10) Patent No.: US 10,996,362 B2
(45) Date of Patent: May 4, 2021

(54) INVERSION FOR MARINE SEISMIC IMAGING OF A FULL REFLECTED WAVEFIELD (71) Applicant: PGS Geophysical AS, Oslo (NO)

(72) Inventors: Shaoping Lu, Houston, TX (US); Faqi Liu, Houston, TX (US); Nizar Chemingui, Houston, TX (US)

(73) Assignee: PGS GEOPHYSICAL AS, Oslo (NO)

(*) Notice: Subject to any disclaimer, the term of this patent is extended or adjusted under 35 U.S.C. 154(b) by 308 days.

(21) Appl. No.: 16/281,812

(22) Filed: Feb. 21, 2019

(65) Prior Publication Data
US 2019/0257967 A1 Aug. 22, 2019

Related U.S. Application Data (60) Provisional application No. 62/723,890, filed on Aug. 28, 2018, provisional application No. 62/633,343, filed on Feb. 21, 2018.

(51) Int. Cl.
G01V 1/36 (2006.01)
G01V 1/34 (2006.01)

(52) U.S. Cl.
CPC ............... G01V 1/368 (2013.01); G01V 1/34 (2013.01)

(58) Field of Classification Search
CPC ...... G01V 1/368; G01V 1/34; G01V 2210/67; G01V 1/28
See application file for complete search history.

(56) References Cited

U.S. PATENT DOCUMENTS

| 2014/0039799 A1* | 2/2014 | Krohn | G01V 1/368 |
| | | | 702/14 |
| 2015/0362608 A1 | 12/2015 | Van Groenestijn | |
| 2019/0187313 A1* | 6/2019 | Chemingui | G01V 1/345 |
| 2019/0257967 A1* | 8/2019 | Lu | G01V 1/368 |

OTHER PUBLICATIONS

Strohmer, et al., "Comments on the Randomized Kaczmarz method"; J. Fourier Analysis and Applications, vol. 15, No. 4, pp. 437-440 (2009) (5 pgs).
Schuster, et al., "Least-squares Cross-well Migration"; 63rd Annual International Meeting, SEG, Expanded Abstracts, pp. 110-113 (1993) (4 pgs).
PRUCHA, et al., "Subsalt event regularization with steering filters"; SEG International Exposition and 72nd Annual Meeting; Salt Lake City, Utah, pp. 922-925 (Oct. 6-11, 2002) (4 pgs).
Lu, et al., "A practical crosstalk attenuation method for separated wavefield imaging"; SEG International Exposition and 86th Annual Meeting, pp. 4235-4239 (2016) (5 pgs).

(Continued)

Primary Examiner — Daniel Pihulic (57) ABSTRACT

Inversion for marine seismic imaging of a full reflected wavefield can include generating an image of a subsurface formation by full wavefield migrating a recorded seismic wavefield and generating numerically modeled data using the image. A mismatch between the numerically modeled data and the seismic wavefield can be determined. Responsive to determining that the mismatch exceeds an inversion match threshold, the image can be updated using the mismatch between the numerically modeled data and the seismic wavefield.

19 Claims, 9 Drawing Sheets (56) References Cited

OTHER PUBLICATIONS

Lu, et al., "Separated-wavefiled imaging using primary and multiple energy"; The Leading Edge—Special section: Multiples from attenuation to imaging, vol. 34, No. 7, pp. 770-778 (Jul. 2015) (7 pgs).
Nemeth, et al., "Least-squares migration of incomplete reflection data"; Geophysics, vol. 64, No. 1 (Jan.-Feb. 1999); p. 208-221,15 Figs.(14 pgs).

* cited by examiner

INVERSION FOR MARINE SEISMIC IMAGING OF A FULL REFLECTED WAVEFIELD

CROSS-REFERENCE TO RELATED APPLICATIONS

This application claims priority to U.S. Provisional Application 62/633,343, filed Feb. 21, 2018 and to U.S. Provisional Application 62/723,890, filed Aug. 28, 2018, both of which are incorporated by reference.

BACKGROUND

The petroleum industry has invested heavily in the development of marine survey techniques that yield knowledge of subsurface formations beneath a body of water in order to find and extract valuable resources, such as oil. High-resolution seismic images of a subsurface formation are helpful for quantitative interpretation and improved reservoir monitoring. For a typical marine survey, a marine survey vessel tows one or more marine survey sources below the sea surface and over a subsurface formation to be surveyed for mineral deposits. Marine survey receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more marine survey sources, which can be impulsive sources such as air guns, non-impulsive sources such as marine vibrator sources, electromagnetic sources, etc., to produce signals at selected times. Each signal is essentially a wave called a wavefield that travels down through the water and into the subsurface formation. At each interface between different types of rock, a portion of the wavefield may be refracted, and another portion may be reflected, which may include some scattering, back toward the body of water to propagate toward the sea surface. The marine survey receivers thereby measure a wavefield that was initiated by the actuation of the marine survey source.

DETAILED DESCRIPTION

The present disclosure is related to inversion for marine seismic imaging of a full reflected wavefield. A marine survey source can emit an acoustic signal. Examples of marine survey sources include air guns and marine vibrators, among others. Pressure and particle motion variation as a function of time and position caused by an acoustic signal from a marine survey source or modeled as being emitted by a modeled marine survey source is called the "source wavefield." One or more marine survey sources can be modeled as a point source. Pressure and particle motion variation as a function of time and position measured by a marine survey receiver or modeled as being received by a modeled marine survey receiver is called the "receiver wavefield."

Goals of seismic processing can include mathematically transforming recorded reflections into seismic images of the earth's subsurface. For example, seismic processing methods can include mathematically simulating wavefield propagation using a computer, where boundary data from a sea surface can be extrapolated into a model of the subsurface. As used herein, propagation is the movement of a wavefield, extrapolation is a simulation of propagation, and migration is a process by which a seismic image is produced through extrapolation of boundary data in space and/or time to another location, such as the subsurface, to produce a seismic image. The boundary data at the sea surface can consist of two parts: a source wavefield, and a receiver wavefield. Some wave equation seismic imaging methods can include extrapolating source and receiver wavefields from the sea surface into a model of the subsurface of the earth, such as a reflectivity model or velocity model, and can produce a seismic image by computing the locations where a source wavefield and a receiver wavefield are in phase. A reflectivity model is a model of the ratio of amplitude of a reflected wave to an incident wave, or how much energy is reflected at various subsurface locations. A velocity model is a model of the rate at which a wave travels through the subsurface, which can vary vertically, laterally, and azimuthally.

Primary wavefields ("primaries") and multiple wavefields ("multiples") can each be divided into down-going and up-going primaries and multiples respectively. As used herein, a down-going primary is a wavefield that is a reflection of an up-going primary. An up-going primary is a reflection of a wavefield emitted by a marine survey source. A down-going multiple is a reflection of an up-going multiple or a reflection of a sea-surface reflection of any wavefield. An up-going multiple is a reflection of a down-going primary or multiple. Some seismic imaging methods only make use of primaries. However, multiples can carry valuable information. According to the present disclosure, it can be beneficial to incorporate multiples in seismic imaging methods. However, correlation based seismic imaging with multiples can generate crosstalk. Crosstalk can be generated by source and receiver wavefields being in phase at locations that are not the same location as a subsurface reflector. According to some previous approaches, attenuation of crosstalk can be achieved by post-processing the seismic image and/or modifying the seismic image conditions. However, according to at least one embodiment of the present disclosure, an inversion solution for imaging the full reflected seismic wavefield, including both primaries and multiples, can directly solve for reflectivity models that explain the boundary observation without involving crosstalk artifacts, thereby combining the contributions from primaries and multiples to create a seismic image from the full reflected wavefield.

At least one embodiment of the present disclosure can exploit the use of the full reflected seismic wavefield in imaging, including multiples that the industry historically has treated as unwanted noise. Using multiples, according to at least one embodiment of the present disclosure, turns each marine survey receiver into a virtual marine survey source, effectively expanding the surface coverage of the marine survey and enhancing the subsurface illumination, particularly for shallow reflectors. Embodiment of the (least squares) full wavefield imaging method described herein can reduce the cost of marine surveys by reducing the need for high density surveys. Furthermore, the inversion solution presented herein can directly compute the earth reflectivity, balance the contributions of different reflection components, and produce seismic images that are free of artifacts and interfering noise.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 232 may reference element "32" in FIG. 2, and a similar element may be referenced as 432 in FIG. 4. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
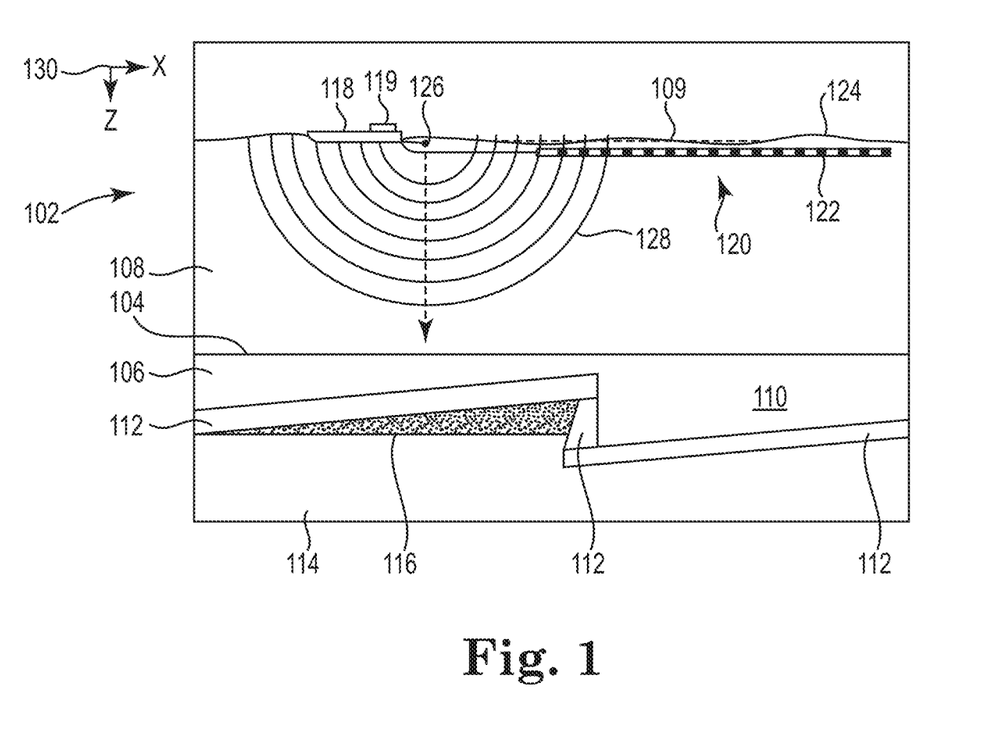
FIG. 1 is an elevation or xz-plane view of an example of marine surveying in which signals are emitted by a marine survey source for recording by marine survey receivers.

FIG. 1 is an elevation or xz-plane 130 view of an example of marine surveying in which signals are emitted by a marine survey source 126 for recording by marine survey receivers 122. The recording can be used for processing and analysis in order to help characterize the structures and distributions of features and materials underlying the surface of the earth. For example, the recording can be used to estimate a physical property of a subsurface location, such as the presence of a reservoir that may contain hydrocarbons. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, underlying rock layer 114, and hydrocarbon-saturated layer 116. One or more elements of the subsurface volume 106, such as the first sediment layer 110 and the uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which marine survey receivers may be coupled. In one type of marine survey, each marine survey receiver, such as the marine survey receiver 122 represented by the shaded disk in FIG. 1, comprises a pair of sensors including a geophone that detects particle displacement within the water by detecting particle motion variation, such as velocities or accelerations, and/or a hydrophone that detects variations in pressure. In one type of marine survey, each marine survey receiver, such as marine survey receiver 122, comprises an electromagnetic receiver that detects electromagnetic energy within the water. The streamers 120 and the marine survey vessel 118 can include sensing electronics and data-processing facilities that allow marine survey receiver readings to be correlated with absolute positions on the sea surface and absolute three-dimensional positions with respect to a three-dimensional coordinate system. In FIG. 1, the marine survey receivers along the streamers are shown to lie below the sea surface 109, with the marine survey receiver positions correlated with overlying surface positions, such as a surface position 124 correlated with the position of marine survey receiver 122. The marine survey vessel 118 can include a controller 119. For example, the controller 119 can be coupled to the marine survey source 126 and configured to control the marine survey source 126. The controller 119 can implement some or all of the system 460 illustrated in FIG. 4. The controller 119 can store the machine-readable medium 572 illustrated in FIG. 5. The controller 119 can be configured to perform some or all of the functions associated with the method flow diagram illustrated in FIG. 6.

The marine survey vessel 118 can tow one or more marine survey sources 126 that produce signals as the marine survey vessel 118 and streamers 120 move across the sea surface 109. Marine survey sources 126 and/or streamers 120 may also be towed by other vessels, or may be otherwise disposed in fluid volume 108. For example, marine survey receivers may be located on ocean bottom cables or nodes fixed at or near the surface 104, and marine survey sources 126 may also be disposed in a nearly-fixed or fixed configuration. For the sake of efficiency, illustrations and descriptions herein show marine survey receivers located on streamers, but it should be understood that references to marine survey receivers located on a "streamer" or "cable" should be read to refer equally to marine survey receivers located on a towed streamer, an ocean bottom receiver cable, and/or an array of nodes.

FIG. 1 shows acoustic energy illustrated as an expanding, spherical signal, illustrated as semicircles of increasing radius centered at the marine survey source 126, representing a down-going wavefield 128, following a signal emitted by the marine survey source 126. The down-going wavefield 128 is, in effect, shown in a vertical plane cross section in FIG. 1. The outward and downward expanding down-going wavefield 128 may eventually reach the surface 104, at which point the outward and downward expanding down-going wavefield 128 may partially scatter, may partially reflect back toward the streamers 120, and may partially refract downward into the subsurface volume 106, becoming elastic signals within the subsurface volume 106.

Imaging of multiples uses the down-going wavefield 128 to exploit the extended illumination provided by sea surface multiple energy, effectively converting the marine survey receivers into virtual marine survey sources. Imaging of multiples and standard migration of primaries are complementary and can augment the overall imaging results when they are combined correctly. However, the contribution of each component cannot be easily balanced when imaging the full wavefield with standard migration. Furthermore, full wavefield migration also involves crosstalk. Although certain processes, such as a deconvolution imaging condition or crosstalk prediction, can be applied to attenuate crosstalk, none of these methods fundamentally resolves the problem. In contrast, at least one embodiment of the present disclosure directly computes the earth reflectivity, balances the contributions of different migration components, and produces a seismic image that is free of interference noise.

Figure 2:
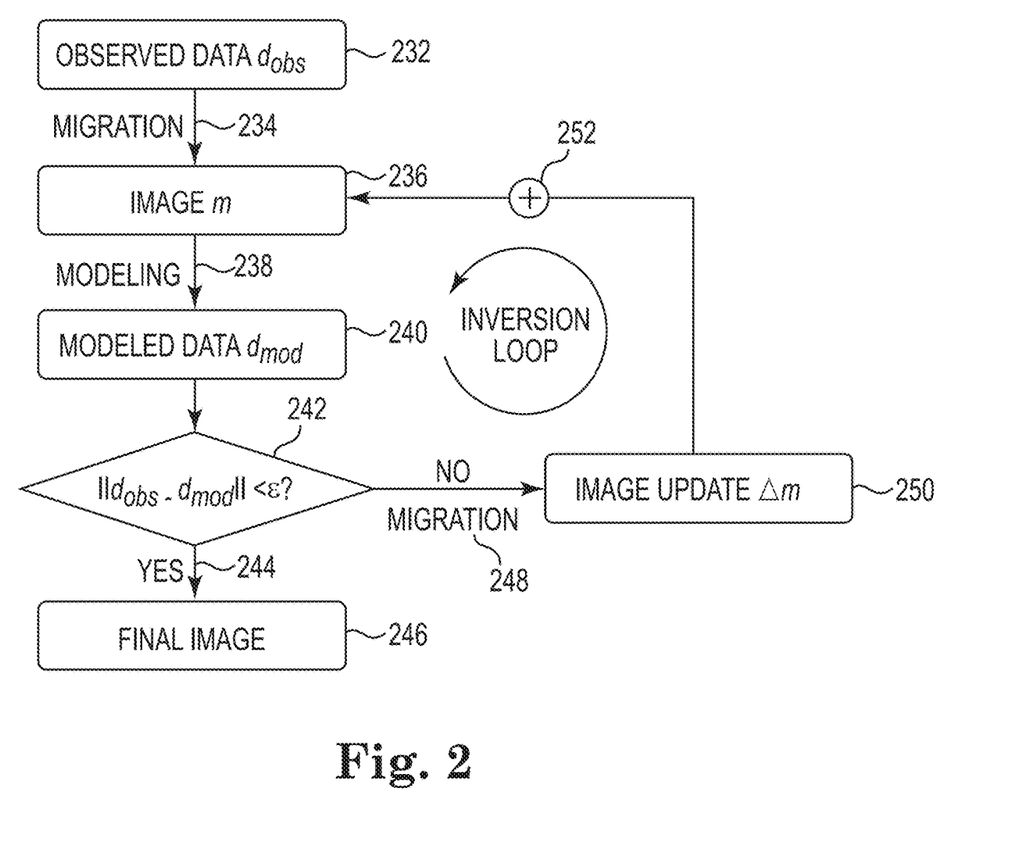
FIG. 2 is a method flow diagram of an example of inversion for marine seismic imaging of a full reflected wavefield.

FIG. 2 is a method flow diagram of an example of inversion for marine seismic imaging of a full reflected wavefield. Given observed data ($d_{obs}$), which can be recorded marine survey data, seismic imaging finds the earth reflectivity m, which can be a seismic image, such as a reflectivity image. Standard depth migration can produce an approximation of the earth's reflectivity:

$$m = L^T d_{obs} \quad (1)$$

where the operator $L^T$ is the adjoint of the modeling operator L. Standard migration is able to produce a structural image of the earth. However, this result often displays uneven illumination, narrow bandwidth, and limited wavenumber content because the migration is not the inverse of a modeling operation.

Least squares full wavefield migration can resolve the inverse of the modeling process:

$$m = (L^T L)^{-1} L^T d_{obs} \quad (2)$$

by solving a minimization problem:

$$m = \text{argmin} \tfrac{1}{2} \| d_{obs} - Lm \|_2^2 \quad (3)$$

using two distinct methods. The first method explicitly computes the matrix $L^T L$ and its inverse, or alternatively, the implicit method used according to at least one embodiment of the present disclosure iteratively inverts the operator L.

The recorded marine survey data 232 ("observed data," $d_{obs}$) can be a pressure signal that represents a full wavefield including primaries and multiples. The pressure signal can be space time series data. At 234, an image (m) 236 of the reflectivity m can be generated by migrating the recorded marine survey data 232. The migration at 234 can include depth imaging in a depth domain (as opposed to a time domain). The migration 234 can be performed by full wavefield migration, or more specifically, least squares full wavefield migration, as described in more detail herein.

At 238, numerically modeled data ($d_{mod}$) 240 can be generated by applying modeling using the image 236 generated by the migration at 234. The numerically modeled data 240 can be based on a modeled marine survey source and a modeled marine survey receiver at or near the sea surface. The numerically modeled data 240 can rely on a velocity model of the subsurface. The velocity model of the subsurface can be previously obtained, for example, from tomography or wavefield inversion of previously obtained data.

At 242 a determination can be made whether a mismatch, such as the absolute value of a difference, between the recorded marine survey data 232 and the numerically modeled data 240 is within or exceeds an inversion match threshold ($\varepsilon$):

$$\| d_{obs} - d_{mod} \| < \varepsilon ? \quad (4)$$

At 248, if the mismatch exceeds the inversion match threshold, the mismatch $\| d_{obs} - d_{mod} \|$ can be migrated at 248 and used to update the image 236 at 252. Otherwise, at 244, the image 236 can be output as the final image 246. As used herein "final image" means that the image is considered to be complete in that no additional processing of the image is desired or required.

More specifically, at 248, an image ($\Delta m$) 250 of the mismatch $\| d_{obs} - d_{mod} \|$ can be generated by migrating the mismatch $\| d_{obs} - d_{mod} \|$. In at least one embodiment, the migration performed at 248 can be performed by the same migration process as the migration performed at 234 of the marine survey data 232. For example, the migration 248 can include depth imaging in a depth domain after subtraction of the numerically modeled data 240 from the recorded marine survey data 232. At 252, the image ($\Delta m$) 250 of the mismatch $\| d_{obs} - d_{mod} \|$ can be added to the initial image 236 to generate an updated image. The updated image can be used as an input to modeling as indicated generally at 238 to generate updated numerically modeled data as indicated generally at 240. However, the modeling to generate the updated numerically modeled data is not an update of the velocity model itself as may be performed in wavefield inversion. Rather, according to at least one embodiment of the present disclosure, any velocity model that the numerically modeled data 240 relies on is not updated as part of the recursive process described herein. The objective is not a better velocity model. The objective is a better image.

As indicated generally at 242, a determination can be made whether the mismatch between the updated numerically modeled data and the recorded marine survey data 232 is within the inversion match threshold. This process can repeat iteratively (as indicated by "inversion loop" in FIG. 2) until the mismatch is within the inversion match threshold. In response to the mismatch being within the inversion match threshold, the updated image can be output as the final image 246.

Least squares full wavefield migration, according to the present disclosure, contrasts with least squares migration according to some previous approaches. For example, with respect to Equations 1-3 above, least squares migration uses an impulsive source wavefield as the boundary condition for the modeling operator (L) and uses up-going primaries only ($P_{up}$) as the boundary observation data ($d_{obs}$) for inversion. In contrast, least squares full wavefield migration according to at least one embodiment of the present disclosure uses the impulsive source wavefield and the down-going wavefield including sea-surface reflections ($P_{down}$) together as the boundary condition for the modeling operator (L) and uses the total upgoing wavefield including primaries and multiples ($P_{up}$) as the boundary observation data ($d_{obs}$) for inversion at 232. The different boundary conditions and boundary observation data used according to at least one embodiment of the present disclosure provides advantages over the previous approaches because it augments the overall imaging results. The inversion solution described herein directly computes reflectivity and balances the contributions of the boundary conditions and boundary observation data to produce images that are free of interference noise.

Figure 3A:
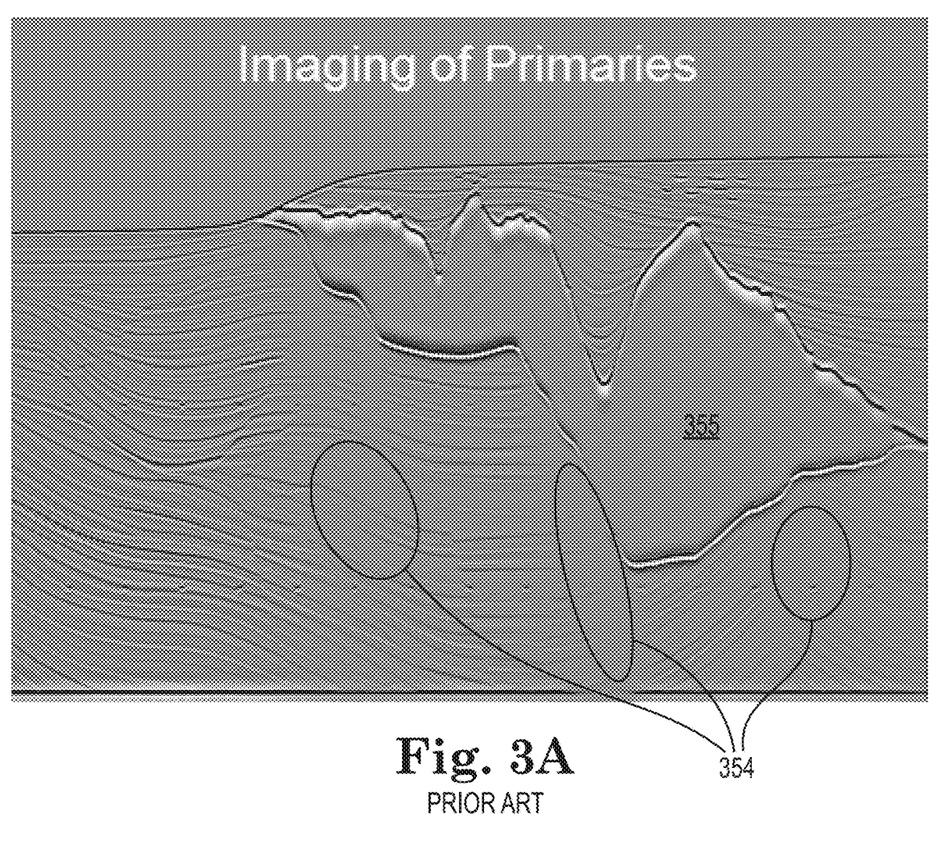
FIG. 3A is an example of a marine seismic image using primaries.
Figure 3B:
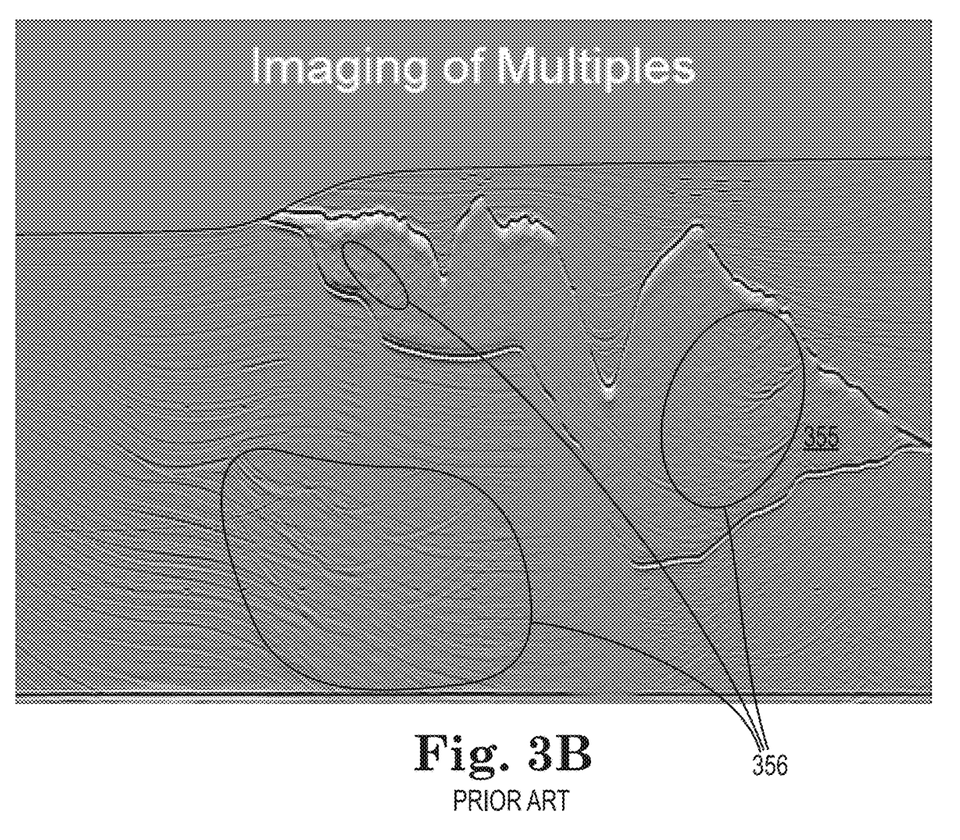
FIG. 3B is an example of a marine seismic image using multiples.
Figure 3C:
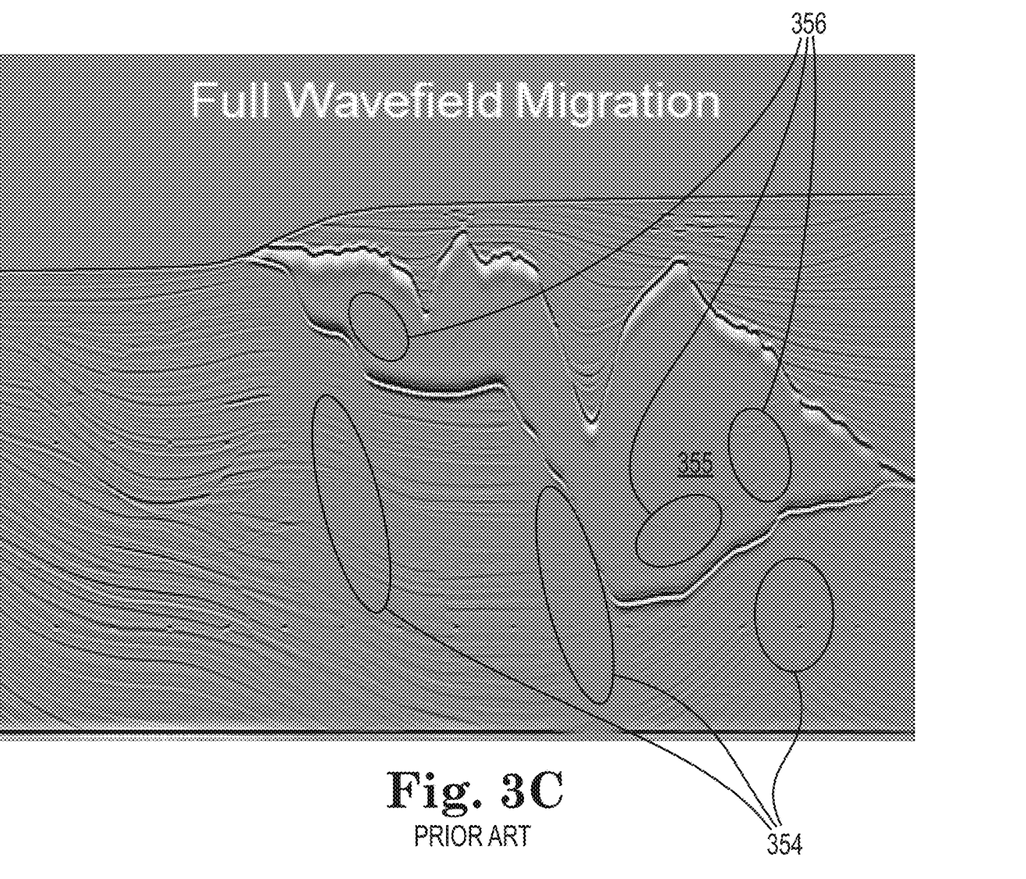
FIG. 3C is an example of a marine seismic image using full wavefield migration.
Figure 3D:
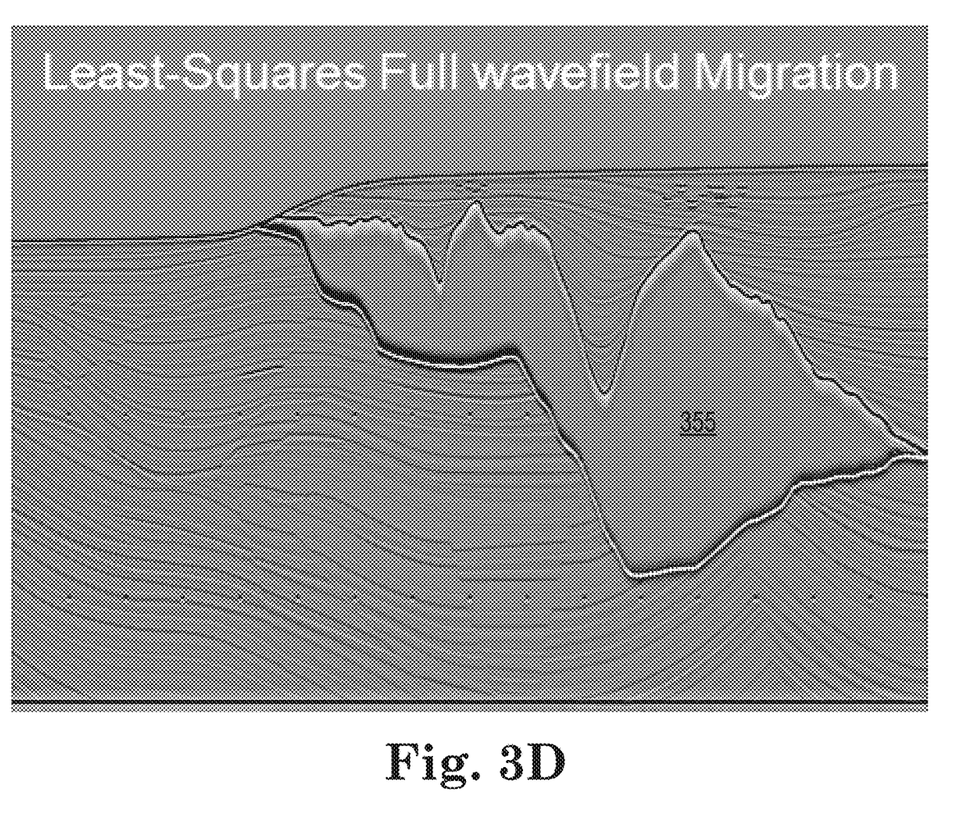
FIG. 3D is an example of a marine seismic image using least squares full wavefield migration.

FIGS. 3A-3D illustrate different imaging results based on different imaging methods being applied to a same dataset. FIGS. 3A-3C are the results of imaging using some previous approaches. FIG. 3D is the result of imaging according to at least one embodiment of the present disclosure. The dataset in this example is the Sigsbee2b model, which is a synthetic numerical model that is available in the public domain.

FIG. 3A is an example of a marine seismic image using primaries. The image in FIG. 3A can be regarded as the result of applying a conventional imaging approach using primaries only without multiples. The image includes a subsurface formation 355. By way of example, the subsurface formation 355 can be associated with a hydrocarbon saturated layer that is the target of seismic imaging. While the image of the subsurface formation 355 is generally free of interreference, the overall image has an illumination issue. Specifically, many of the reflections in the image are not continuous, resulting in "holes" 354 in the image. In some instances, such discontinuities may be misinterpreted. For example, such a misinterpretation could be an indication of the existence of a subsurface formation where one does not exist. Note, for example, that the holes 354 may appear to indicate a same material as that within the subsurface formation 355. Another example of such a misinterpretation is an indication of a different material than a material that primarily comprises the background material in the survey area, such as a hydrocarbon pocket.

FIG. 3B is an example of a marine seismic image using multiples. As can be seen clearly, the image includes crosstalk 356 that appears both inside and outside the image of the subsurface formation 355. The crosstalk 356 may also be referred to in the art as noise or interference. In some instances, the crosstalk 356 may be misinterpreted, for example, where it is not recognized as crosstalk. Such a misinterpretation could take the form of indicating background material where a hydrocarbon pocket exists (see, for example, the crosstalk 356 within the subsurface formation 355).

FIG. 3C is an example of a marine seismic image using full wavefield migration. Full wavefield migration jointly images both primaries and multiples. As shown FIG. 3C, the resulting image may be contaminated with crosstalk 356, although the crosstalk 356 may be attenuated versus that which appears in the image using multiples (see FIG. 3B). Some of the crosstalk 356 is visible within the subsurface formation 355. The image also includes some of the holes 354 that were apparent from the image using primaries illustrated in FIG. 3A, although the holes 354 are attenuated.

FIG. 3D is an example of a marine seismic image using least squares full wavefield migration according to at least one embodiment of the present disclosure. As can be seen, the image is free of holes and crosstalk that were present in various forms in the images in FIGS. 3A-3C. The area within the subsurface formation 355 in the image is clear, free of crosstalk, and has clearly illuminated borders. The area outside the subsurface formation 355 includes clearly defined and continuous reflections. The image illustrated in FIG. 3D can be generated using an inversion based on least squares full wavefield migration as described above with respect to FIG. 2.

Figure 4:
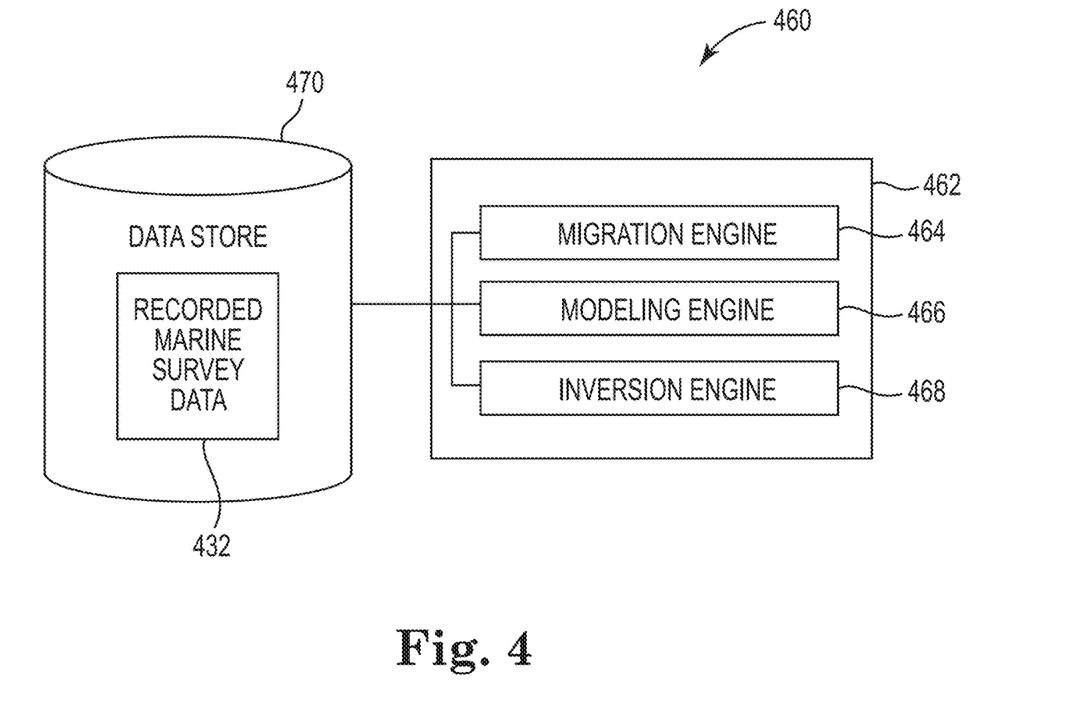
FIG. 4 is a diagram of an exemplary embodiment of a system for inversion for marine seismic imaging of a full reflected wavefield.

FIG. 4 illustrates a diagram of an example of a system 460 for inversion for marine seismic imaging of a full reflected wavefield. The system 460 can include a machine 462 coupled to a data store 470. The data store 470 can store recorded marine survey data 432 that can be analogous to recorded marine survey data 232 described with respect to FIG. 2. The machine 462 can include engines, such as a migration engine 464, a modeling engine 466, and an inversion engine 468. The machine 462 and engines can be in communication with the data store 470 via a communication link. The system 460 can include additional or fewer engines than illustrated to perform the various functions described herein. The system 460 can represent program instructions and/or hardware of a machine. As used herein, an "engine" can include program instructions and/or hardware, but at least includes hardware. Hardware is a physical component of a machine that enables it to perform a function. Examples of hardware can include a processing resource, a memory resource, a logic gate, etc.

The engines can include a combination of hardware and program instructions that is configured to perform functions described herein. The program instructions, such as software, firmware, etc., can be stored in a memory resource such as a machine-readable medium, etc., as well as hard-wired program such as logic. Hard-wired program instructions can be considered as both program instructions and hardware. Other hardware, for example, can include a processing resource, such as at least one processor, and a memory resource, such as a machine-readable medium or other non-transitory memory resource. The memory resource can be internal and/or external to the machine 462. For example, the machine 462 can include an internal memory resource and have access to an external memory resource, such as the data store 470. Executable instructions can be stored on the machine-readable medium as machine-readable and executable instructions to implement a particular function. For example, the executable instructions can be executed by the processing resource. The memory resource can be coupled to the machine 462 in a wired and/or wireless manner. For example, the memory resource can be an internal memory, a portable memory, a portable disk, and/or a memory associated with another resource, for example, enabling the executable instructions to be transferred and/or executed across a network such as the Internet. In at least one embodiment, the memory resource can be a plurality of non-transitory machine-readable media.

The memory resource can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of non-transitory machine-readable media.

The processing resource can be coupled to the memory resource via a communication path. The communication path can be local or remote to the system 460. Examples of a local communication path can include an electronic bus internal to a machine, where the memory resource is in communication with the processing resource via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path can be such that the memory resource is remote from the processing resource, such as in a network connection between the memory resource and the processing resource. That is, the communication path can be a network connection. Examples of such a network connection can include a local area network, wide area network, personal area network, and the Internet, among others. In at least one embodiment, the system 460 represents functionality that is either wholly or partially implemented by a machine onboard a marine survey vessel, such as the marine survey vessel 118, or on shore.

The migration engine 464 can be configured to generate an image of a subsurface formation by full wavefield migrating recorded marine survey data 432. The modeling engine 466 can be configured to generate numerically modeled data using the image generated by the migration engine 464. In at least one embodiment, the modeling engine can be configured to generate the numerically modeled data using the image and using a previously obtained velocity model of the subsurface formation. The inversion engine 468 can be configured to determine a mismatch between the numerically modeled data generated by the modeling engine 466 and the recorded marine survey data 432. The inversion engine 468 can be configured to update the image using the mismatch responsive to determining that the mismatch exceeds an inversion match threshold.

In at least one embodiment, the migration engine 464 can be configured to generate an image of the mismatch using a same full wavefield migration process as used to generate the image of the subsurface formation. The full wavefield migration process can be least squares full wavefield migration, as described herein, and the recorded marine survey data 432 can include primaries and multiples. The inversion engine 468 can be configured to update the image of the subsurface formation by adding the image of the mismatch thereto. In at least one embodiment, the system can be configured to recursively update the image, generate numerically modeled data using the updated image, and determine the mismatch until the mismatch (updated mismatch) is within the inversion match threshold.

The inversion engine 468 can be configured to provide the image as a final image of the subsurface formation responsive to determining that the mismatch is within the inversion match threshold. The inversion engine 468 can be configured to provide the image as a final image after one or multiple iterations. Providing the image can include displaying the image on an electronic monitor. Providing the image can include sending an electronic copy of the image to a user or to another system component. Providing the image can include providing an indication to a user that the image is ready for commercial use.

Figure 5:
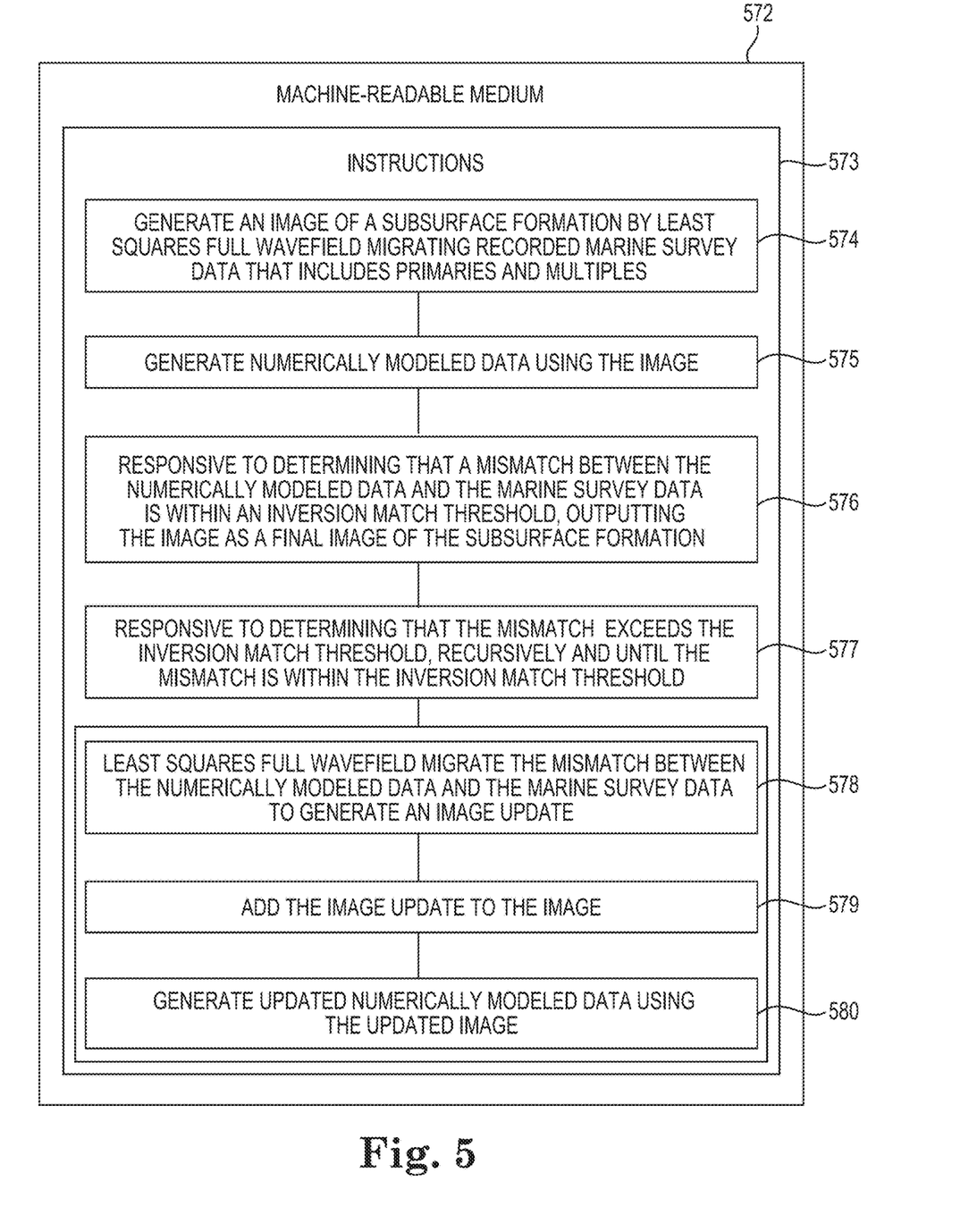
FIG. 5 is a diagram of an exemplary embodiment of a machine-readable medium for inversion for marine seismic imaging of a full reflected wavefield.

FIG. 5 illustrates a diagram of an example of a machine-readable medium 572 for inversion for marine seismic imaging of a full reflected wavefield. The machine-readable medium 572 can be non-transitory. The machine-readable medium 572 can store instructions 573 executable by a processing resource. For example, at 574, the machine-readable medium 572 can store instructions 573 executable to generate an image of a subsurface formation by least squares full wavefield migrating recorded marine survey data that includes primaries and multiples. At 575, the machine-readable medium 572 can store instructions 573 to generate numerically modeled data using the image. In at least one embodiment, the instructions to generate the numerically modeled data can include instructions to generate the numerically modeled data using the image and using a previously obtained velocity model of the subsurface formation. At 576, the machine-readable medium 572 can store instructions 573 to output the image as a final image of the subsurface formation responsive to determining that a mismatch between the numerically modeled data and the marine survey data is within an inversion match threshold. At 577, the machine-readable medium 572 can store instructions 573 to execute the instructions at 578, 579, and 580 recursively and until the mismatch is within the inversion match threshold responsive to determining that the mismatch exceeds the inversion match threshold. In at least one embodiment, the instructions 573 to execute the instructions at 578, 579, and 580 recursively do not include instructions to update the velocity model. For example, in some embodiments the velocity model is not updated as part of the marine seismic imaging of the full reflected wavefield according to the present disclosure.

At 578, the machine-readable medium 572 can store instructions 573 to least squares full wavefield migrate the mismatch between the numerically modeled data and the marine survey data to generate an image update. At 579, the machine-readable medium 572 can store instructions 573 to add the image update to the image. At 580, the machine-readable medium 572 can store instructions 573 to generate updated numerically modeled data using the updated image. Although not specifically illustrated in FIG. 5, after the instructions 573 at 580 are executed, further instructions can be executed to determine whether a mismatch between the updated numerically simulated data and the marine survey data is within the inversion match threshold. Although not specifically illustrated, the machine-readable medium 572 can store instructions 573 to output an updated image in response to the mismatch being within the inversion match threshold after at least one recursive iteration. In at least one embodiment, the final image of the subsurface formation does not include crosstalk. The image can be a reflectivity image.

Figure 6:
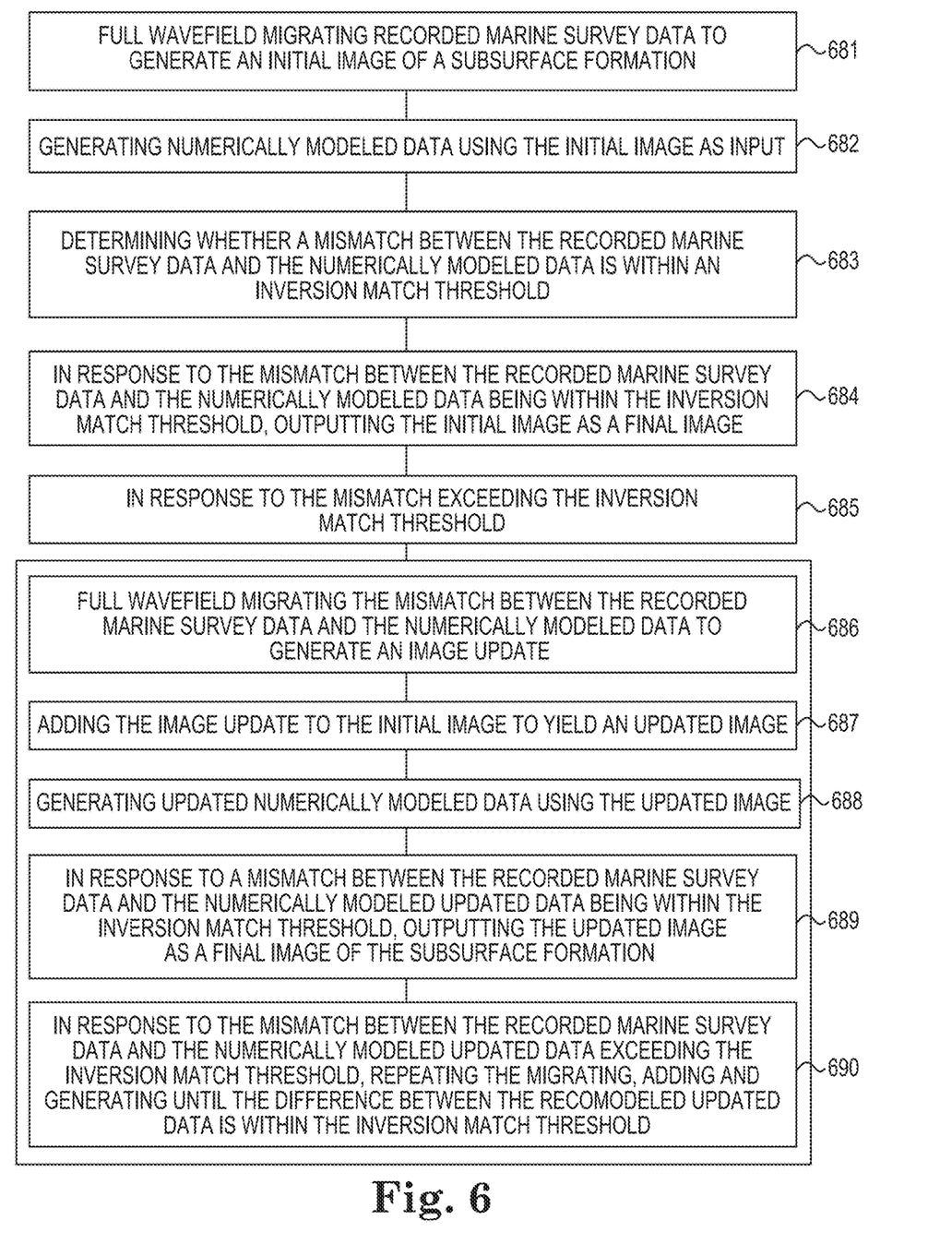
FIG. 6 is an exemplary embodiment of a method for inversion for marine seismic imaging of a full reflected wavefield.

FIG. 6 is a method flow diagram for inversion for marine seismic imaging of a full reflected wavefield. At 681, the method can include full wavefield migrating recorded marine survey data to generate an initial image of a subsurface formation. The full wavefield migrating can be least squares full wavefield migrating both primaries and multiples in the recorded marine survey data in a depth domain as described herein. At 682, the method can include generating numerically modeled data using the initial image as input. In at least one embodiment, generating the numerically modeled data can include using a previously obtained velocity model. For example, the velocity model can be obtained via tomography or waveform inversion. In at least one embodiment, the method does not include updating the numerically modeled data.

At 683, the method can include determining whether a mismatch between the recorded marine survey data and the numerically modeled data is within an inversion match threshold. At 684, the method can include, in response to the mismatch between the recorded seismic data and the numerically modeled data being within the inversion match threshold, outputting the initial image as a final image. At 685, the method can include, in response to the mismatch exceeding the inversion match threshold, performing the method elements illustrated at 686-688 and 689 or 690.

At 686, the method can include full wavefield migrating the mismatch between the recorded marine survey data and the numerically modeled data to generate an image update. At 687, the method can include adding the image update to the initial image to yield an updated image. At 688, the method can include generating updated numerically modeled data using the updated image. At 689, the method can include, in response to a mismatch between the recorded marine survey data and the updated numerically modeled data being within the inversion match threshold, outputting the updated image as a final image of the subsurface formation. At 690, the method can include, in response to the mismatch between the recorded marine survey data and the updated numerically modeled data exceeding the inversion match threshold, repeating the migrating, adding, and generating until the mismatch between the recorded marine survey data and the numerically modeled data is within the inversion match threshold.

In accordance with a number of embodiments of the present disclosure, a geophysical data product may be manufactured by obtaining recorded marine survey data, generating an image of a subsurface formation by full wavefield migrating the recorded marine survey data, generating numerically modeled data using the image, determining a mismatch between the numerically modeled data and the seismic wavefield, updating the image using the mismatch between the numerically modeled data and the seismic wavefield responsive to determining that the mismatch exceeds an inversion match threshold, and recording the updated image on a non-transitory machine readable medium thereby generating the geophysical data product. Updating the image may be performed offshore or onshore either within the United States or in another country. If the geophysical data product is manufactured offshore or in another country, it may be imported onshore to a facility in the United States.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system for inversion for marine seismic imaging of a full reflected wavefield, the system comprising hardware resources including:
   a migration engine configured to generate an image of a subsurface formation by full wavefield migrating recorded marine survey data;
   a modeling engine configured to generate numerically modeled data using the image;
   an inversion engine configured to:
      determine a mismatch between the numerically modeled data and the recorded marine survey data; and
      responsive to determining that the mismatch exceeds an inversion match threshold, update the image using the mismatch between the numerically modeled data and the recorded marine survey data.

2. The system of claim 1, wherein the inversion engine is configured, responsive to determining that the mismatch is within the inversion match threshold, provide the image as a final image of the subsurface formation.

3. The system of claim 1, wherein the system is configured to recursively update the image, generate updated numerically modeled data using the updated image, and determine the mismatch until the mismatch is within the inversion match threshold.

4. The system of claim 1, wherein the modeling engine is configured to generate the numerically modeled data using the image and using a previously obtained velocity model of the subsurface formation.

5. The system of claim 1, wherein the migration engine is configured to generate an image of the mismatch using a same full wavefield migration process as used to generate the image of the subsurface formation; and
   wherein the inversion engine is configured to update the image by adding the image of the mismatch thereto.

6. The system of claim 5, wherein the recorded marine survey data includes primaries and multiples; and
   wherein the migration engine is configured to generate the image by least squares full wavefield migrating the recorded marine survey data including the primaries and the multiples.

7. A non-transitory machine-readable medium storing instructions executable by a processing resource to:
   generate an image of a subsurface formation by least squares full wavefield migrating recorded marine survey data that includes primaries and multiples;
   generate numerically modeled data using the image;
   responsive to determining that a mismatch between the numerically modeled data and the marine survey data is within an inversion match threshold, outputting the image as a final image of the subsurface formation;
   responsive to determining that the mismatch exceeds the inversion match threshold, recursively and until the mismatch is within the inversion match threshold:
      least squares full wavefield migrate the mismatch between the numerically modeled data and the marine survey data to generate an image update;
      add the image update to the image; and
      generate updated numerically modeled data using the updated image.

8. The medium of claim 7, further including instructions to output an updated image in response to the mismatch being within the inversion match threshold after at least one recursive iteration.

9. The medium of claim 7, wherein the image of the subsurface formation does not include crosstalk.

10. The medium of claim 9, wherein the image of the subsurface comprises a reflectivity image.

11. The medium of claim 7, further including instructions to generate the numerically modeled data using the image and using a previously obtained velocity model of the subsurface formation; and
   wherein the instructions to perform the recursive iterations do not include instructions to update the velocity model.

12. A system for inversion for marine seismic imaging of a full reflected wavefield, the system comprising:
   means for generating an image of a subsurface formation by least squares full wavefield migrating recorded marine survey data that includes primaries and multiples;
   means for generating numerically modeled data using the image;

means for outputting the image as a final image of the subsurface formation responsive to determining that a mismatch between the numerically modeled data and the marine survey data is within an inversion match threshold;

means for, responsive to determining that the mismatch exceeds the inversion match threshold, recursively and until the mismatch is within the inversion match threshold:
  least squares full wavefield migrate the mismatch between the numerically modeled data and the marine survey data to generate an image update;
  add the image update to the image; and
  generate updated numerically modeled data using the updated image.

13. A method for inversion for marine seismic imaging of a full reflected wavefield, comprising:
  full wavefield migrating recorded marine survey data to generate an initial image of a subsurface formation;
  generating numerically modeled data using the initial image as input;
  determining whether a mismatch between the recorded marine survey data and the numerically modeled data is within an inversion match threshold; and
  in response to the mismatch between the recorded marine survey data and the numerically modeled data being within the inversion match threshold, outputting the initial image as a final image;
  in response to the mismatch exceeding the inversion match threshold:
    full wavefield migrating the mismatch between the recorded marine survey data and the numerically modeled data to generate an image update;
    adding the image update to the initial image to yield an updated image; and
    generating updated numerically modeled data using the updated image;
    in response to a mismatch between the recorded marine survey data and the updated numerically modeled data being within the inversion match threshold, outputting the updated image as a final image of the subsurface formation;
    in response to the mismatch between the recorded marine survey data and the updated numerically modeled data exceeding the inversion match threshold, repeating the migrating, adding, and generating until the mismatch between the recorded marine survey data and the updated numerically modeled data is within the inversion match threshold.

14. The method of claim 13, wherein generating the numerically modeled data further comprises using a previously obtained velocity model.

15. The method of claim 14, further comprising obtaining the velocity model via tomography or waveform inversion.

16. The method of claim 13, wherein the method does not include updating the numerically modeled data.

17. The method of claim 13, wherein full wavefield migrating comprises least square full wavefield migrating both primaries and multiples in the recorded marine survey data.

18. The method of claim 17, wherein least squares full wavefield migrating comprises migrating in a depth domain.

19. A method of manufacturing a geophysical data product, the method comprising:
  obtaining recorded marine survey data;
  generating an image of a subsurface formation by full wavefield migrating the recorded marine survey data;
  generating numerically modeled data using the image;
  determining a mismatch between the numerically modeled data and the recorded marine survey data;
  responsive to determining that the mismatch exceeds an inversion match threshold, updating the image using the mismatch between the numerically modeled data and the recorded marine survey data; and
  recording the updated image on a non-transitory machine-readable medium thereby generating the geophysical data product.

* * * * *